March 15, 1932. W. KOSFELD 1,849,626
MACHINE FOR AUTOMATICALLY SHAPING STONES AND THE LIKE
Filed Oct. 29, 1929 5 Sheets-Sheet 1

Inventor:
Wilhelm Kosfeld
by
Attorney

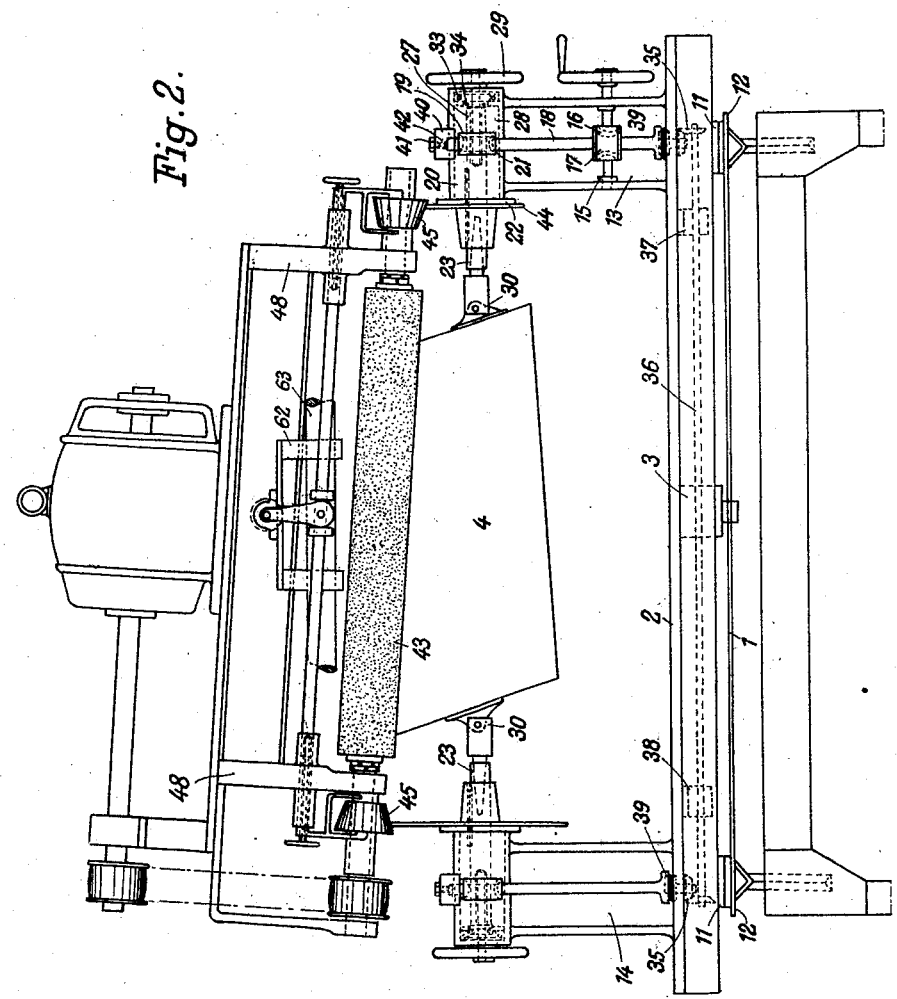

March 15, 1932. W. KOSFELD 1,849,626
MACHINE FOR AUTOMATICALLY SHAPING STONES AND THE LIKE
Filed Oct. 29, 1929 5 Sheets-Sheet 3
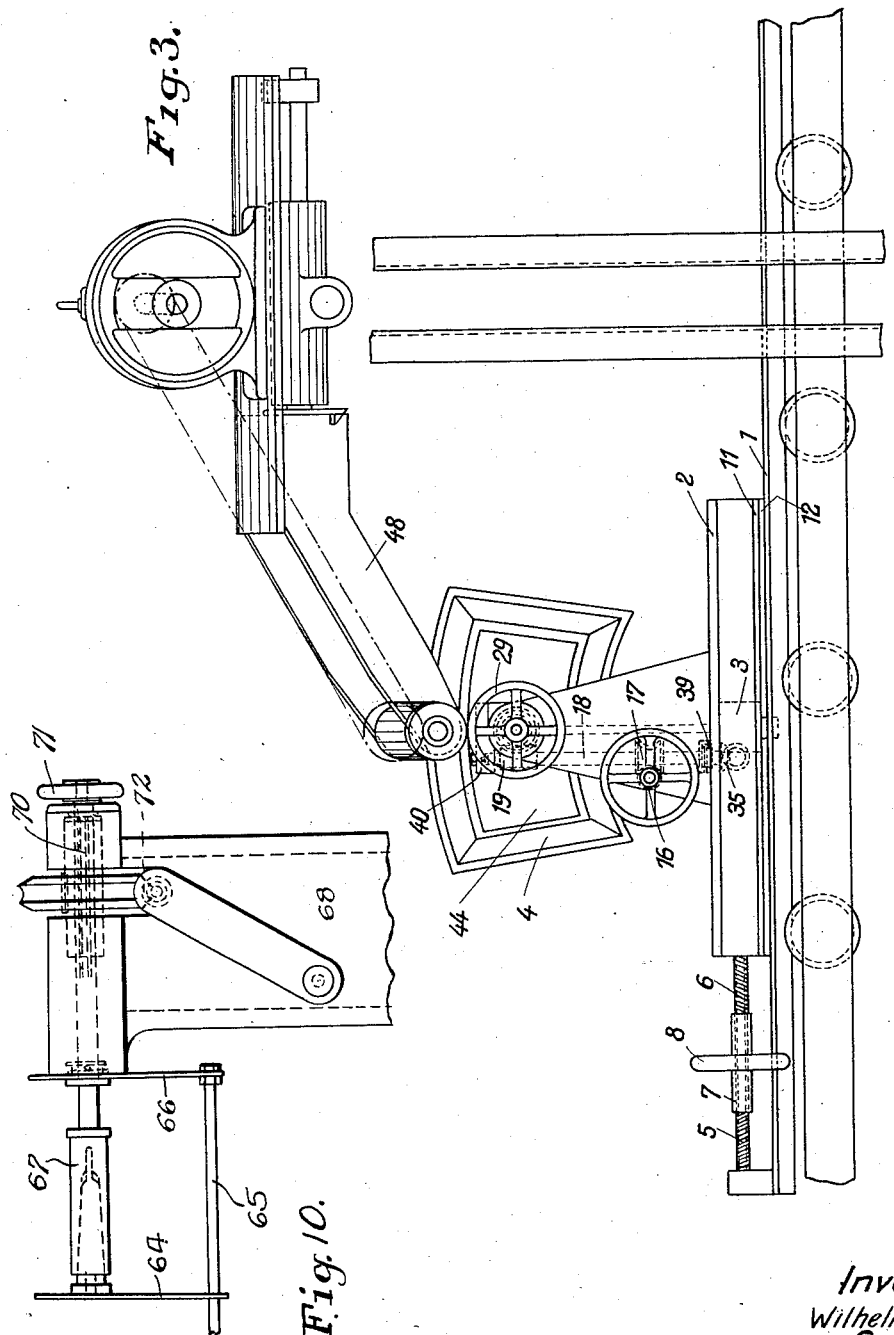
Inventor:
Wilhelm Kosfeld
by
Attorney

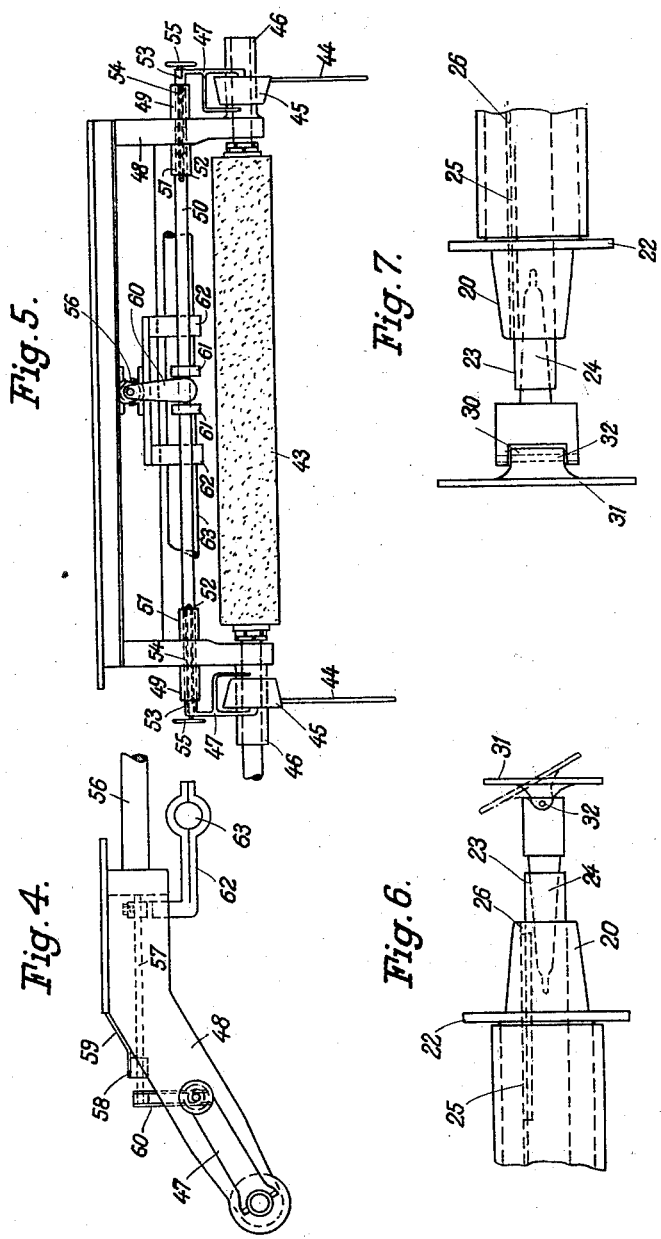

March 15, 1932.  W. KOSFELD  1,849,626
MACHINE FOR AUTOMATICALLY SHAPING STONES AND THE LIKE
Filed Oct. 29, 1929  5 Sheets-Sheet 5

Inventor:
Wilhelm Kosfeld
by
Attorney

Patented Mar. 15, 1932

1,849,626

UNITED STATES PATENT OFFICE

WILHELM KOSFELD, OF DORTMUND, GERMANY, ASSIGNOR TO VEREINIGTE STAHL-WERKE AKTIENGESELLSCHAFT, OF DUSSELDORF, GERMANY

MACHINE FOR AUTOMATICALLY SHAPING STONES AND THE LIKE

Application filed October 29, 1929, Serial No. 403,258, and in Germany October 1, 1926.

The present invention relates to an improvement of the machine for grinding, polishing or milling profile stones according to the U. S. Patent 1,691,898 and makes possible the production of pipe shelves, keystones, annular bodies and profiles of any kind closed in themselves.

Preferably such stones are produced by first moulding them with the necessary allowance followed by burning, whereupon the closed profiles are finished to exact dimensions on a grinding or milling machine respectively. This way of proceeding offers great advantages. As is well known to those acquainted with the art, the burning operation makes it impossible to finish certain shapes, particularly parts of bodies of revolution like hollow cylindrical or hollow conical segments to accurate dimensions at the first instance. In consequence thereof the stones have to be refinished at the place of use which involves considerable expense or low grade work has to be put up with. In this case irregular and large joints are formed in the refractory masonry which, as is well known, are the points that are first attacked and give rise to the destruction of the entire refractory masonry. With the machine according to the present invention it becomes possible to manufacture such parts with an accuracy hitherto unknown, which has a favorable effect in every respect. The invention consists in the fact that the work is clamped below a swivelling tool between pivotally mounted plates, conjointly rotating templates on the spindle of the said plates and jaws regulating the vertical position of the grinding tool whilst rotating.

Grinding machines for the production of glass profiles closed in themselves and lenses are already known. In said machines the profiles or lenses are held between two opposite clamping discs, rotatably mounted on a swinging frame and are brought in the desired position with respect to a fixed tool by means of a pattern, mounted on the shaft of said discs and held in permanent contact with a fixed guide. But it is not possible with said known machine to obtain the following results, which are on the contrary obtainable with the machine according to present invention:

1. A conical grinding by changing the relative angular position of the axes of the shafts carrying respectively the work and the grinding tool.
2. A double inclination of the grinding roller in itself and relative to the work respectively.
3. An adjustment of the horizontal angular relative position of work and tool.
4. Machining of large and heavy pieces of work.
5. Use of large grinding rollers.

Other features and advantages of the invention are received in the following description.

In the annexed drawings—

Fig. 2 is a front view of the same,

Fig. 3 is a side view,

Figure 9:
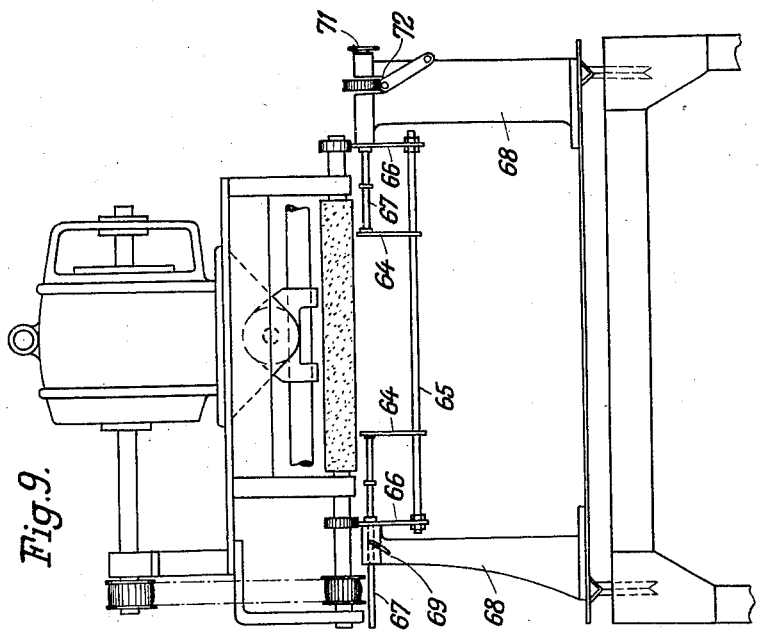
Figure 8:
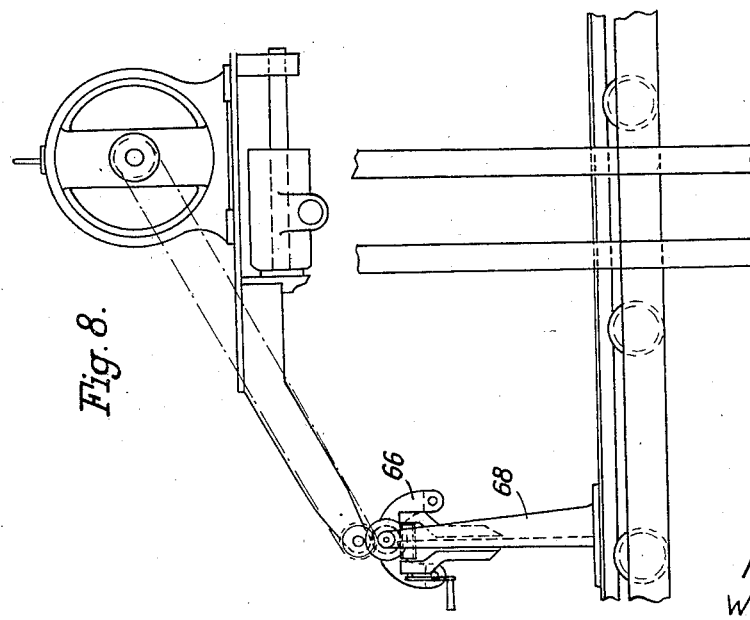

Fig. 4 is a side view of the same of the arrangement for actuating the guide rolls of the templates, Fig. 5 is a front view of the arrangement shown in Fig. 4, Figs. 6 and 7 show the adjustable gripping jaws with Morse cone, Fig. 8 is a side view of the arrangement for grinding pipe shelves and smaller segments, Fig. 9 is a front view of the arrangement shown in Fig. 8, Fig. 10 is a view of the driving device with clamping means for the arrangement shown in Fig. 9.

Figure 1:
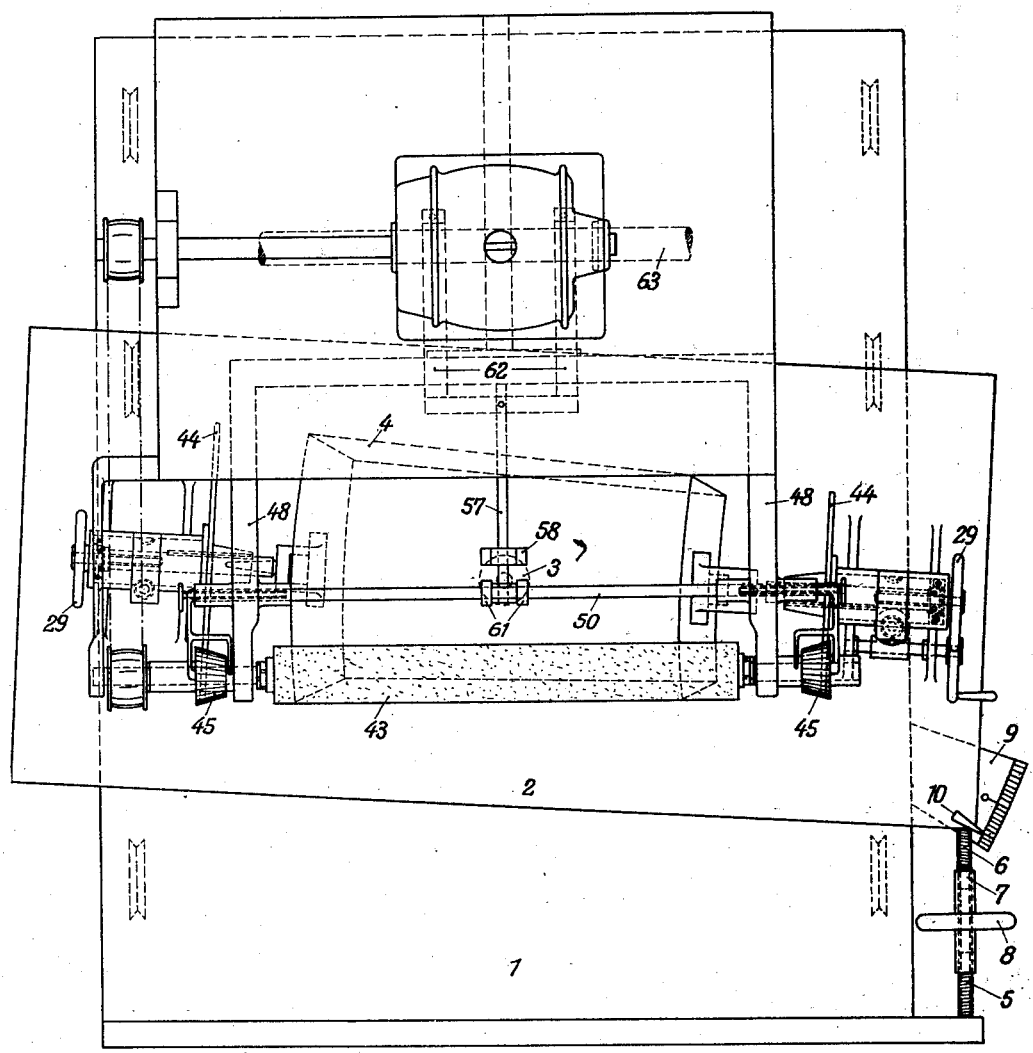
Fig. 1 is a plan view of a machine embodying the invention.

In Fig. 1 a plan view, in Figs. 2 and 3 a front and side view respectively, is illustrated. An inspection of these figures will show that on the table 1 of the grinding machine is mounted a second table 2 which turns on a vertical journal 3. In order to adjust the table 2 with the work piece 4 relatively to the axis of the grinding roller, the screw-threaded spindles 5 and 6 are fixed on tables 1 and 2. The screw-threaded spindles 5 and 6 are connected to the sleeve 7 by a left and right handed thread, the swivelling of the tables being effected by rotating the hand wheel 8. The table 1 carries a dial 9 graduated in millimeters, the table 2 carries an indicator 10. On swivelling the table 2 the indicator 10 indicates in millimeters the angular position of the axis of table 2 relatively to the axis of the grinding roller. Near the ends of the table 2 the slide faces 11 are provided which slide upon the slide bars 12 mounted on the table 1. On the table 2 two brackets 13 and 14 are screwed serving at the same time as bearings as well as clamping devices.

In the bracket 13 the driving spindle 15 is journaled which may be hand operated as shown or power driven. The driving spindle carries the worm 16 which engages with the worm wheel 17 on the spindle 18. On the spindle 18 is mounted the worm 19 driving the sleeve 20 by means of a worm wheel 21 milled in the sleeve 20. This sleeve or bushing 20 is provided with a flange 22 serving as a bearing surface for the template (Fig. 7). Within the bushing 20 there is a gripping sleeve 23 receiving a Morse cone 24. The sleeve 23 carries a key 25 which slides in a keyway 26 of the bushing 20, thus preventing rotary movement of the sleeve 23. At the opposite end of the sleeve 23 an internal thread 27 is provided for the adjustment in axial direction. This axial adjustment is effected by means of the screw threaded spindle 28 through the hand wheel 29. As a result of this adjustment of the sleeve 23 the work-piece 4 is clamped between the clamping jaws 30. The construction of these clamping jaws is such that they may swing in two directions so as to make it possible to clamp oblique end-faces. They consist of the pressure plate 31, the fulcrum pin 32 and the Morse cone 24 and are shown in Figs. 6 and 7. For the purpose of taking up the counter-pressure caused by the clamping of the work-piece 4, ball bearings 33 and 34 are provided. The construction of the bracket 14 is a counterpart of that of the bracket 13 described above. To the bracket 14 motion is transmitted by means of the bevel gear wheels or screw wheels 35 and the shaft 36 supported in the bearings 37 and 38. The bevel and screw wheels are secured to the spindles 18 and 36 below the table 2. The spindles 18 at their lower ends are journaled in ball bearings 39, at their upper ends in flanges 40, which are screwed on the brackets 13 and 14. For the purpose of an accurate adjustment and in order to avoid idle running of the spindle 18 the set screws 41 with a ball 42 are provided.

When the rotating device with the work-piece clamped between the clamping jaws, is being actuated and the table 1 advanced into a position below the grinding roller 43 the templates 44, whilst in rotation, bear against the tapered rolls 45 and the work-piece 4 will be accurately ground to the configuration of the template in one step over its entire periphery. The rolls 45 have a taper and are, at the point of their greatest thickness, of exactly the diameter of the grinding roller 43. (Fig. 5.) They are slightly fitted on the end journal 46 and are held in position by the roll holders 47. The roll holders 47 are guided in the brackets 48 through the bushing 49. Between the brackets 48 the connecting rod 50 is supported in journals 51. Both ends of the connecting rod 50 are screw-threaded at 52, the guide pin of the roll holder carries a thread 53. The screw threaded spindle 54 and hand wheel 55 connect the connecting rod 50 to the roll holder 47. In case of the grinding roller 43 being worn down, by rotating the hand wheel 55 the tapered rolls 45 are shifted through the roll holders 47 and may be accurately adjusted according to the diameter of the grinding roller 43.

Further adjustment of the tapered rolls 45 in axial direction is effected through the connecting rod 50.

In working heavily tapered work-pieces, such as are shown in Figs. 1 to 3 the conical rolls 45 would not bear against the templates 44 in a position corresponding to the diameter of the grinding roller, but would, according to the inclination of the tool carrier 48 occupy the position of the latter. Since the tool carrier 48 executes a circular movement in its pivot pin bearing 56, also the position of the rolls would be changed and the latter would slide off the templates in the case of too great an inclination of the grinding roller.

This drawback may be avoided by the provision of the arrangement shown in Figs. 2, 4 and 5.

In the pivot pin 56 of the fork the shaft 57 is journaled. A second bearing 58 is fixed to the iron sheet connection 59 of the tool carrier 48. On the shaft 57 is mounted a forked connecting piece 60 above the rod 50 and in engagement with the two adjusting rings 61. The shaft 57 is rigidly secured to the shaft 63 by means of the two arms 62.

If the grinding roller 43 is now brought to an inclined position the templates will remain below the conical rolls 45 in engagement therewith in a predetermined position.

In Figs. 8, 9 and 10 another apparatus is shown which preferably is used for grinding smaller work-pieces, such as pipe shelves, and other profiles and will be employed in grinding thin work capable of standing only a limited amount of clamping and grinding pressure. The advantage consists in that the clamping jaws 64 have about the shape of the work-piece in order to get a larger clamping surface. Another advantage consists in that the clamping jaws 64 are guided on the connecting rods 65 which are fixed to the templates 66, whereby uniform pressure is applied to the work-piece. In this construction the connecting rods 65 are arranged to transmit the motion of the spindle 67 and template 66. The spindle 67 may be adjusted in the standard 68 and locked in position by means of a lock lever 69. Fixing of the work-piece is effected by means of the screw threaded spindle 70 and hand wheel 71 mounted on the standard 68. In the standard 68 there is a worm gear 72 that may be hand or power driven.

What I claim and desire to secure by Letters Patent of the United States is:

1. In a machine for automatically shaping stones and the like with peripheral profiles closed in themselves, particularly hollow cylindrical and hollow conical segments, comprising in combination a grinding roller, supports for said roller including means permitting rising and falling movement of the roller and means permitting tilting of the roller, revoluble clamping jaws disposed below the swivelling tool and having on their spindles conjointly rotating templates cooperating with means movable with the grinding roller in its up and down and tilting movements to cause any predetermined rising and falling and tilting movement of the grinding roller, means for rotating the grinding roller and means for rotating the clamping jaws and the templates.

2. In a machine for automatically shaping stones and the like with peripheral profiles closed in themselves, particularly hollow cylindrical and hollow conical segments, comprising in combination a grinding roller, supports for said roller including means permitting rising and falling movement of the roller and means permitting tilting of the roller, revoluble clamping jaws arranged to swing in two directions below the swivelling tool and having on their spindles conjointly rotating templates cooperating with means movable with the grinding roller in its up and down and tilting movements to cause any predetermined rising and falling and tilting movement of the grinding roller, means for rotating the grinding roller and means for rotating the clamping jaws and the templates.

3. In a machine for automatically shaping stones and the like with peripheral profiles closed in themselves, particularly hollow cylindrical and hollow conical segments, comprising in combination a grinding roller, supports for said roller including means permitting rising and falling movement of the roller and means permitting tilting of the roller, revoluble clamping jaws disposed below the swivelling tool and having on their spindles conjointly rotating templates cooperating with means movable with the grinding roller in its up and down and tilting movements to cause any predetermined rising and falling and tilting movement of the grinding roller, means for rotating the grinding roller and means for rotating the clamping jaws and the templates and finally two rods mounted between the templates so as to transmit the rotary movement from the right hand template to the left hand template and to guide the clamping jaws.

4. In a machine for automatically shaping stones and the like with peripheral profiles closed in themselves, particularly hollow cylindrical and hollow conical segments, comprising in combination a grinding roller, supports for said roller including means permitting rising and falling movement of the roller and means permitting tilting of the roller, revoluble clamping jaws disposed below the swivelling tool on a table angularly adjustable and having on their spindles conjointly rotating templates cooperating with means movable with the grinding roller in its up and down and tilting movements to cause any predetermined rising and falling and tilting movement of the grinding roller, means for rotating the grinding roller and means for rotating the clamping jaws and the templates.

5. In a machine for automatically shaping stones and the like with peripheral profiles closed in themselves, particularly hollow cylindrical and hollow conical segments, comprising in combination a grinding roller, supports for said roller including means permitting rising and falling movement of the roller and means permitting tilting of the roller, revoluble clamping jaws disposed below the swivelling tool and having on their spindles conjointly rotating templates cooperating with rolls movable with the grinding roller in its up and down and tilting movements and being adjustable by means of screw threaded spindles arranged at both ends of their shafts and having their position regulated by a connecting rod, to cause any predetermined rising and falling and tilting movement of the grinding roller, means for rotating the grinding roller and means for rotating the clamping jaws and the templates.

WILHELM KOSFELD.